United States Patent
Movellan et al.

(10) Patent No.: US 10,032,091 B2
(45) Date of Patent: Jul. 24, 2018

(54) SPATIAL ORGANIZATION OF IMAGES BASED ON EMOTION FACE CLOUDS

(71) Applicant: Emotient, Inc., San Diego, CA (US)

(72) Inventors: Javier Movellan, La Jolla, CA (US);
Joshua Susskind, La Jolla, CA (US);
Ken Denman, Cherry Hills Village, CO (US)

(73) Assignee: Emotient, Inc., San Diego, CA (US)

( * ) Notice: Subject to any disclaimer, the term of this patent is extended or adjusted under 35 U.S.C. 154(b) by 0 days.

(21) Appl. No.: 14/297,395

(22) Filed: Jun. 5, 2014

(65) Prior Publication Data
US 2015/0071557 A1 Mar. 12, 2015

Related U.S. Application Data

(60) Provisional application No. 61/831,610, filed on Jun. 5, 2013.

(51) Int. Cl.
G06K 9/62 (2006.01)
G06K 9/00 (2006.01)

(52) U.S. Cl.
CPC ......... G06K 9/622 (2013.01); G06K 9/00677 (2013.01)

(58) Field of Classification Search
None
See application file for complete search history.

(56) References Cited

U.S. PATENT DOCUMENTS

| | | | |
|---|---|---|---|
| 8,358,811 B2 * | 1/2013 | Adams et al. | 382/118 |
| 8,660,358 B1 * | 2/2014 | Bergboer et al. | 382/190 |
| 2008/0232697 A1 * | 9/2008 | Chen et al. | 382/225 |
| 2010/0271395 A1 * | 10/2010 | Isogai | G06F 17/30247 345/635 |
| 2011/0129126 A1 * | 6/2011 | Begeja | G06K 9/00295 382/118 |
| 2013/0050460 A1 * | 2/2013 | Steinberg | G06K 9/00208 348/77 |
| 2013/0129231 A1 * | 5/2013 | Dale et al. | 382/224 |
| 2014/0242560 A1 | 8/2014 | Movellan et al. | |
| 2014/0314284 A1 | 10/2014 | Movellan et al. | |
| 2014/0314310 A1 | 10/2014 | Movellan et al. | |
| 2014/0315168 A1 | 10/2014 | Movellan et al. | |
| 2014/0316881 A1 | 10/2014 | Movellan et al. | |
| 2014/0321737 A1 | 10/2014 | Movellan et al. | |
| 2014/0375886 A1 * | 12/2014 | Galleguillos | G06F 17/30793 348/571 |

OTHER PUBLICATIONS

Quadrianto et al., Kernelized Sorting, Advances in neural information processing systems, 2009, 1289-1296.
Whitehill et al., Towards Practical Smile Detection, IEEE on Pattern Analysis and Machine Intelligence, 2009, 2106-2111, 31(11).

* cited by examiner

Primary Examiner — Sumati Lefkowitz
Assistant Examiner — Jiangeng Sun
(74) Attorney, Agent, or Firm — Blank Rome LLP

(57) ABSTRACT

A collection of photos is organized by arranging a limited number of clusters of the photos on a predefined topology, so that similar photos are placed in the same cluster or a nearby cluster. Similarity is measured in attribute space. The attributes may include automatically recognized facial expression attributes.

20 Claims, 6 Drawing Sheets

SPATIAL ORGANIZATION OF IMAGES BASED ON EMOTION FACE CLOUDS

CROSS-REFERENCE TO RELATED APPLICATION

This application claims the benefit of and priority to U.S. provisional patent application Ser. No. 61/831,610, entitled "SPATIAL ORGANIZATION OF IMAGES BASED ON EMOTION FACE CLOUDS", filed on Jun. 5, 2013, which is hereby incorporated by reference in its entirety as if fully set forth herein, including, without limitation, text, figures, claims, tables, and computer program listing appendices (if present), and all other matter in the United States provisional patent application, for any and all purposes.

FIELD OF THE INVENTION

This document relates generally to apparatus, methods, and articles of manufacture for organizing and visualizing collections of images.

BACKGROUND OF THE INVENTION

With the widespread use of image capturing devices such as digital cameras and smartphones, and the availability of both local and cloud storage, it is more and more difficult to organize and explore images without an organizing scheme. The trivial cost of capturing and storing photographs combined with typical resistance of people to removing even duplicative (essentially redundant) photographs of virtually the same subjects in the same settings and at the same times results in information bloat in the photo collections. Finding a particular photograph or a subset of photographs of some interest is difficult. Additionally, mapping photos onto a spatial representation in an organized fashion can be difficult due to overlapping images occluding each other, and limited screen real estate, and loading a large number of photos into a browser at once can be memory prohibitive.

SUMMARY OF THE INVENTION

A need in the art thus exists to facilitate searching for photographs of particular interest. Another need exists for collapsing similar photographs into smaller groups and to see the big picture within a collection, and to navigate within the collection.

Embodiments described in this document are directed to methods, apparatus, and articles of manufacture that may satisfy one or more of the above described and other needs.

In some embodiments, a computer-implemented method of spatially organizing a collection of images includes obtaining the collection of images, an attribute vector for each of the images including attribute values for each image relating to similarity of the images, a topology for mapping the images, a maximum number of images to be displayed, and a definition of topology distance in the space of the topology; sorting and clustering the images topologically by the similarity of the images as related by the attribute values and the definition of the topology distance to obtain a plurality of clusters of the images, the plurality of clusters including no more clusters than the maximum number of images to be displayed; picking representative images for the clusters; and displaying the representative images for the clusters.

In some embodiments, the attribute values of said each image include one or more facial expression values, human appearance characteristic values, low level feature values, or some combination thereof. Obtaining the attribute vector for said each image may further include obtaining a collection of automatically or manually collected attribute vectors for the collection of images or processing said each image of the collection of images to obtain the attribute vector. The attribute vector for said each image may include the attribute values of said each image in a predefined order.

The topology for mapping the images may include a line, circle, grid, zoomable map, torus, surface of a sphere, or volume of a cube. The topology may represent pairwise distances between attribute vectors using a minimum number of dimensions or a multidimensional scaling method.

Other embodiments include computing devices configured to perform the foregoing methods and articles of manufacture including non-transitory machine-readable memory embedded with computer code to perform such methods.

These and other features and aspects of the present invention will be better understood with reference to the following description, drawings, and appended claims.

BRIEF DESCRIPTION OF THE FIGURES

This application contains at least one figure/drawing executed in color. Copies of this application with color figure(s)/drawing(s) will be provided upon request and payment of the necessary fee. A brief summary of the figures is provided below.

DETAILED DESCRIPTION

Figure 1:
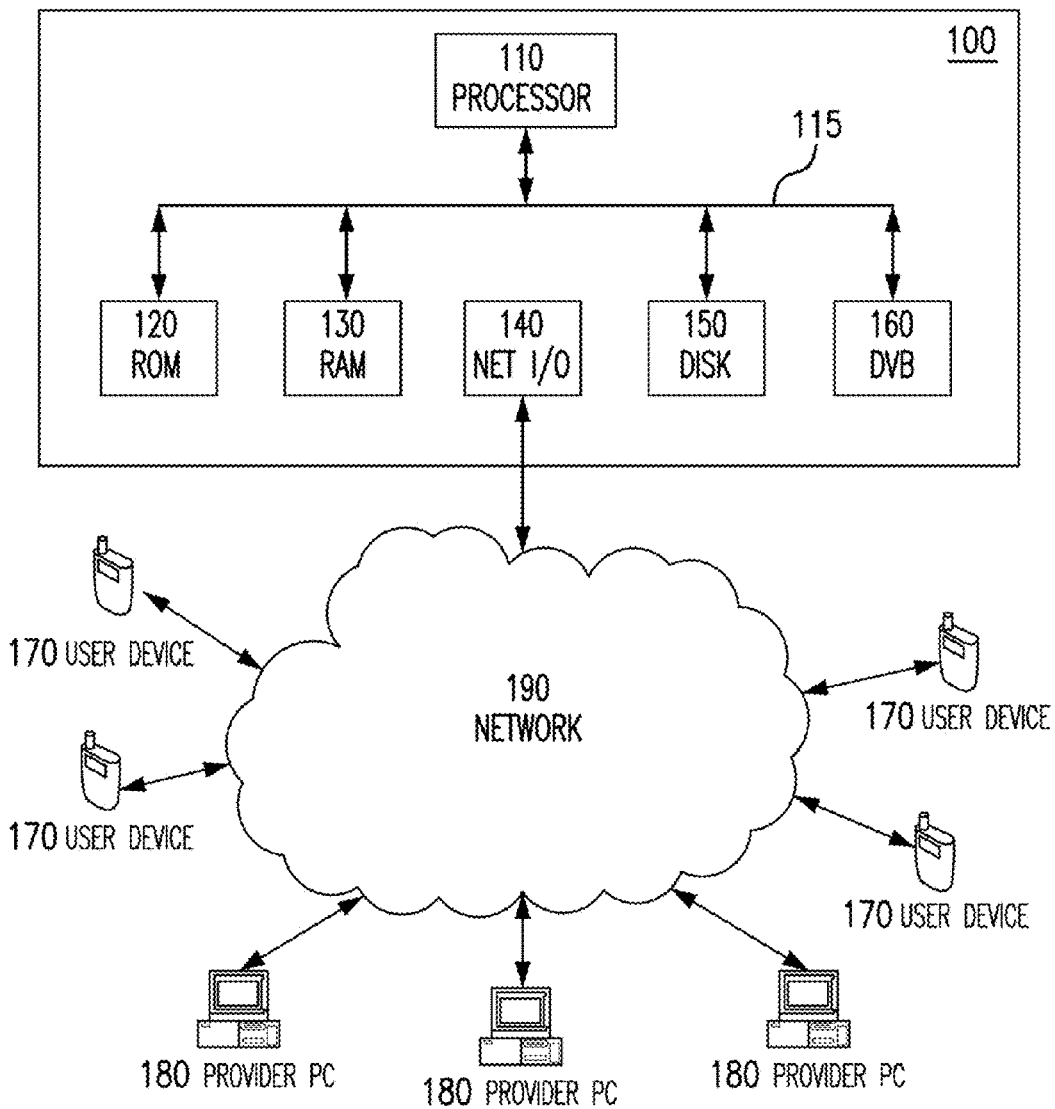
FIG. 1 is a simplified block diagram representation of a computer-based system configured in accordance with selected aspects of the present description.

In this document, the words "embodiment," "variant," "example," and similar expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar expressions and phrases may be used to indicate one of a number of different possible embodiments. The number of possible embodiments/variants/examples is not necessarily limited to two or any other quantity. Characterization of an item as "exemplary" means that the item is used as an example. Such characterization of an embodiment/variant/example does not necessarily mean that the embodiment/variant/example is a preferred one; the embodiment/variant/example may but need not be a currently preferred one. All embodiments/variants/examples are described for illustration purposes and are not necessarily strictly limiting.

The words "couple," "connect," and similar expressions with their inflectional morphemes do not necessarily import an immediate or direct connection, but include within their meaning connections through mediate elements.

"Computing device," "computer," and analogous expressions refer to one or devices including at least a tangible computing element. Examples of a tangible computing element include but are not limited to a microprocessor, application specific integrated circuit, programmable gate array, and the like. Examples of a computing device include but are not limited to a mobile computing device such as a smart phone or tablet computer, a wearable computing device (e.g., Google® Glass), a laptop computer, a desktop computer, a server, a client that communicates with a server, a smart television, a game counsel, a part of a cloud computing system, or any other form of computing device. The computing device preferably includes or accesses storage for instructions used to perform steps such as those discussed in this document and data such as images on which those steps may be performed.

"Computer-implemented" and analogous expressions refer to technology implemented using, by, or on one or more computing devices.

"Causing to be displayed" and analogous expressions refer to taking one or more actions that result in displaying. A computing device, under control of program code, may cause to be displayed a picture and/or text, for example, to the user of the computing device. For example, a computing device may cause pictures and/or text to be displayed directly to a user. For another example, a server computer under control of program code may cause a web page or other information to be displayed by making the web page or other information available for access by a client computer or mobile device, over a network, such as the Internet, which web page the client computer or mobile device may then display to a user of the computer or the mobile device.

References to "images," "photographs," and "photos" may be used interchangeably, regardless of the source of the images/photographs.

"Facial expressions" as used in this document signifies the primary facial expressions of emotion (such as Anger, Contempt, Disgust, Fear, Happiness, Sadness, Surprise, Neutral); expressions of affective state of interest (such as boredom, interest, engagement); so-called "facial action units" (movements of a subset of facial muscles, including movement of individual muscles, such as the action units used in the facial action coding system); and gestures (such as tilting head, raising and lowering eyebrows, eye blinking, nose wrinkling). Automated facial expression recognition is described in a number of commonly-owned patent applications, including (1) application entitled SYSTEM FOR COLLECTING MACHINE LEARNING TRAINING DATA FOR FACIAL EXPRESSION RECOGNITION, by Javier R. Movellan, et al., Ser. No. 61/762,820, filed on or about 8 Feb. 2013; (2) application entitled ACTIVE DATA ACQUISITION FOR DEVELOPMENT AND CONTINUOUS IMPROVEMENT OF MACHINE PERCEPTION SYSTEMS, by Javier R. Movellan, et al., Ser. No. 61/763,431, filed on or about 11 Feb. 2013; (3) application entitled EVALUATION OF RESPONSES TO SENSORY STIMULI USING FACIAL EXPRESSION RECOGNITION, Javier R. Movellan, et al., Ser. No. 61/763,657, filed on or about 12 Feb. 2013; (4) application tentatively entitled AUTOMATIC FACIAL EXPRESSION MEASUREMENT AND MACHINE LEARNING FOR ASSESSMENT OF MENTAL ILLNESS AND EVALUATION OF TREATMENT, by Javier R. Movellan, et al., Ser. No. 61/763,694, filed on or about 12 Feb. 2013; (5) application entitled ESTIMATION OF AFFECTIVE VALENCE AND AROUSAL WITH AUTOMATIC FACIAL EXPRESSION MEASUREMENT, Ser. No. 61/764,442, filed on or about 13 Feb. 2013, by Javier R. Movellan, et al.; (6) application entitled FACIAL EXPRESSION TRAINING USING FEEDBACK FROM AUTOMATIC FACIAL EXPRESSION RECOGNITION, filed on or about 15 Feb. 2013, by Javier R. Movellan, et al., Ser. No. 61/765,570; and (7) application entitled QUALITY CONTROL FOR LABELING MACHINE LEARNING TRAINING EXAMPLES, Ser. No. 61/765,671, filed on or about 15 Feb. 2013, by Javier R. Movellan, et al; and (8) application entitled AUTOMATIC ANALYSIS OF NON-VERBAL RAPPORT, Ser. No. 61/766,866, filed on or about 20 Feb. 2013, by Javier R. Movellan, et al. Each of these provisional applications is incorporated herein by reference in its entirety, including claims, tables, computer code and all other matter in the patent applications.

"Human appearance characteristic" includes facial expressions and additional appearance features (ethnicity, gender, attractiveness, apparent age, and stylistic characteristics such as clothing and hair styles).

"Low level features" are low level in the sense that they are not attributes used in everyday life language to describe facial information, such as eyes, chin, cheeks, brows, forehead, hair, nose, ears, gender, age, ethnicity, etc. Examples of low level features include Gabor orientation energy, Gabor scale energy, Gabor phase, and Haar wavelet outputs. Additional examples of low-level features include representations determined using a textured description filter such as a Scale Invariant Feature Transform (SIFT), Histograms of Oriented Gradients (HOG), Principal Component Analysis (PCA), Independent Component Analysis, and/or neural network architectures.

Other and further explicit and implicit definitions and clarifications of definitions may be found throughout this document.

Reference will be made in detail to several embodiments that are illustrated in the accompanying drawings. Same reference numerals are used in the drawings and the description to refer to the same apparatus elements and method steps. The drawings are in a simplified form, not to scale, and omit apparatus elements and method steps that can be added to the described systems and methods, while possibly including certain optional elements and steps.

FIG. 1 is a simplified block diagram representation of a computer-based system 100, configured in accordance with selected aspects of the present description to interact with crowdsourcing providers at provider machines 180 (such as personal computers or PCs, smartphones, tablets, wearable computing devices such as Google® Glass, other computing devices, and network-enabled cameras) through a communication network 190. In particular, the system 100 and the provider machines 180 may be configured for use in obtaining training data through the use of mimicry, as is described in this document.

FIG. 1 does not show many hardware and software modules of the system 100 or of the provider machines 180, and omits several physical and logical connections. The system 100 may be implemented as a special purpose data processor, a general-purpose computer, a computer system, or a group of networked computers or computer systems configured to perform the steps of the methods described in this document. In some embodiments, the system 100 is built on a personal computer platform, such as a Wintel PC, a Linux computer, or a Mac computer. The personal computer may be a desktop or a notebook computer. The system 100 may function as a server computer. In some embodiments, the system 100 is implemented as a plurality of computers interconnected by a network, such as the network 190, or another network.

As shown in FIG. 1, the system 100 includes a processor 110, read only memory (ROM) module 120, random access memory (RAM) module 130, network interface 140, a mass storage device 150, and a database 160. These components are coupled together in FIG. 1 by a bus 115. In the illustrated embodiment, the processor 110 may be a microprocessor, and the mass storage device 150 may be a magnetic disk drive. The mass storage device 150 and each of the memory modules 120 and 130 are connected to the processor 110 to allow the processor 110 to write data into and read data from these storage and memory devices. The network interface 140 couples the processor 110 to the network 190, for example, the Internet. The nature of the network 190 and of the devices that may be interposed between the system 100 and the network 190 determine the kind of network interface 140 used in the system 100. In some embodiments, for example, the network interface 140 is an Ethernet interface that connects the system 100 to a local area network, which, in turn, connects to the Internet. The network 190 may, therefore, in fact include a collection of networks.

The database 160 may be used for storing and organizing a collection of images. The database 160 may be a physically separate system coupled to the processor 110. In alternative embodiments, the processor 110 and the mass storage device 150 may be configured to perform the functions of the database 160.

The processor 110 may read and execute program code instructions stored in the ROM module 120, the RAM module 130, and/or the storage device 150. Under control of the program code, the processor 110 may configure the system 100 to perform the steps of the methods described or mentioned in this document. In addition to the ROM/RAM modules 120/130 and the storage device 150, the program code instructions may be stored in other machine-readable storage media, such as additional hard drives, Flash memories, legacy media such as floppy diskettes, CD-ROMs, and DVDs, and other machine-readable storage media and/or devices. The program code can also be transmitted over a transmission medium, for example, over electrical wiring or cabling, through optical fiber, wirelessly, or by any other form of physical transmission. The transmission can take place over a dedicated link between telecommunication devices, or through a wide area or a local area network, such as the Internet, an intranet, an extranet, a cloud computing environment or portion thereof, or any other kind of public or private network. The program code may also be downloaded into the system 100 through the network interface 140 or another network interface.

The methods described in this document may also be performed in a non-networked environment, or more precisely, without reliance on a network. The methods described in this document may also be performed by computing devices different from those discussed with respect to FIG. 1. For example, the methods may be performed on a stand-alone user device—a personal computer, smartphone, tablet, digital camera, or any other computing device.

Figure 2:
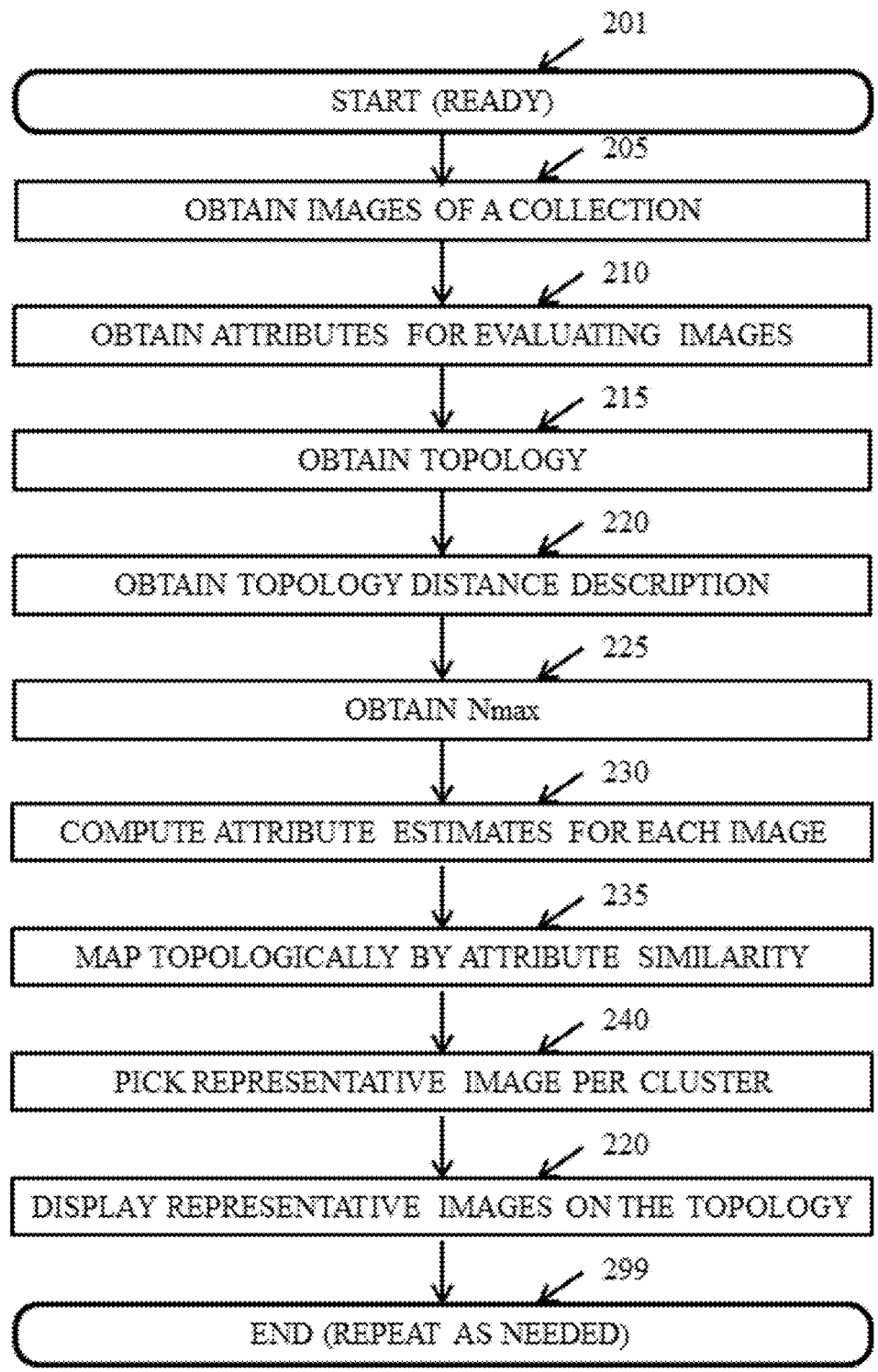
FIG. 2 illustrates selected steps of a process for spatially organizing and displaying a collection of images.
Figure 3:
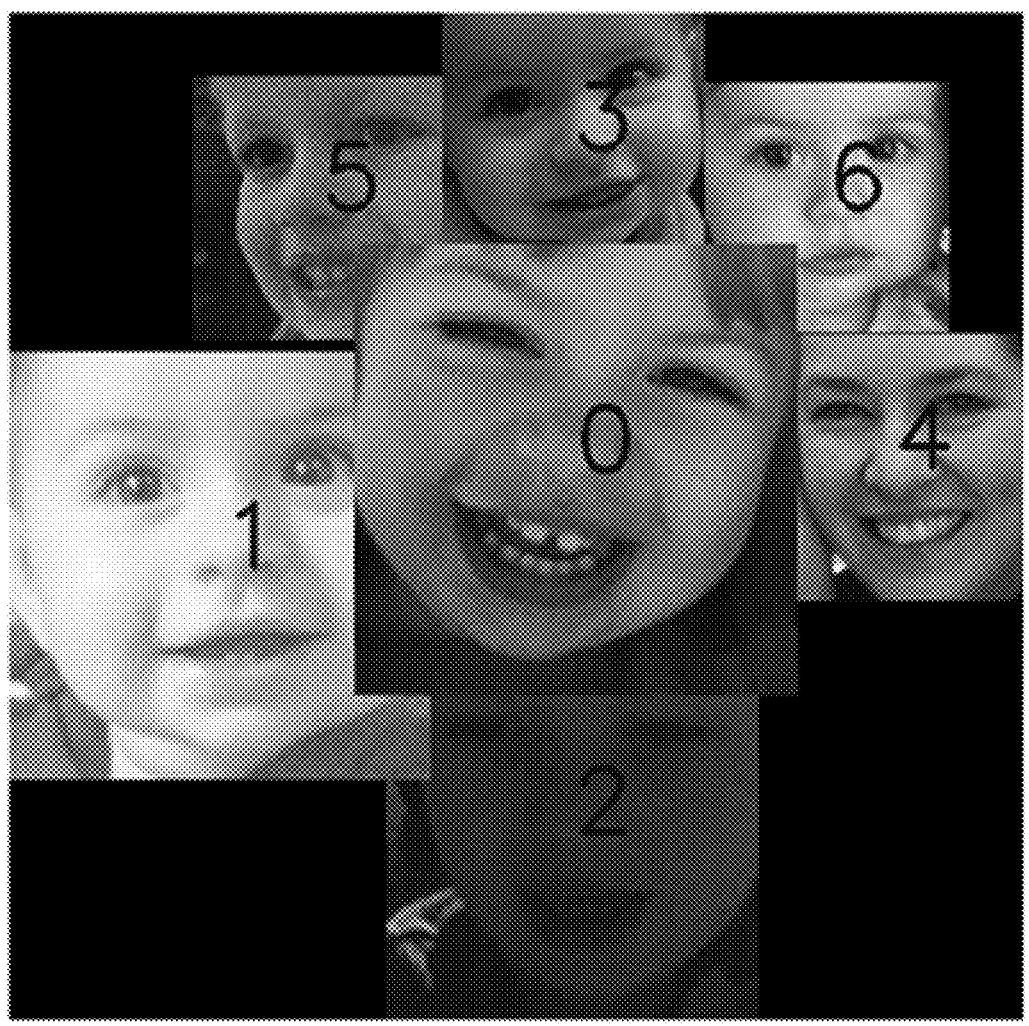
FIG. 3 illustrates a face cloud.
Figure 4:
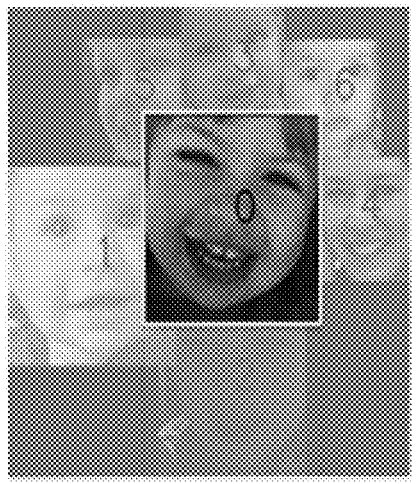
FIG. 4 illustrates a cluster in the face cloud.
Figure 4:
Figure 5:
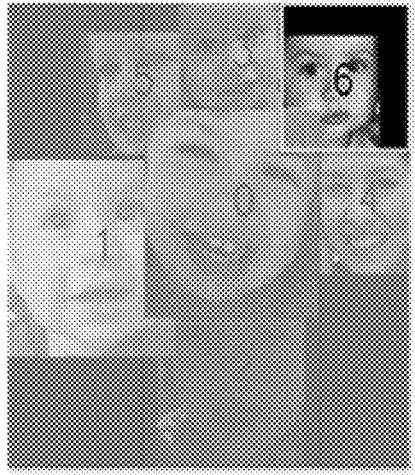
FIG. 5 illustrates another cluster in the face cloud.
Figure 5:
Figure 6:
FIG. 6 illustrates a display of representative photos of clusters.

FIG. 2 illustrates selected steps of a process 200 for organizing photos, visualizing the photos, and drilling down into the visualization. The organization may be according to one or more attributes of the photos. The attributes may include any or all attributes associated with facial expressions and human appearance characteristics. The process 200 organizes the photos of the collection so that a maximum number of picture clusters populate the topology, with each cluster having a representative photo of that cluster on top (visible without drilling down). The clusters preferably are such that the photos in a particular cluster are similar as measured by the distances in the attribute space.

At flow point 201, the computer system is powered and configured to perform the steps of the process 200.

In step 205, the system receives information sufficient to identify and obtain the collection of photos to be organized. Information may be, for example, a link to where the photos are stored in the cloud (e.g., Google+) or on local storage such as a drive (built-in or attached hard drive, flash drive, memory card, optical drive). The photos may also be stored remotely but not necessarily in the cloud. Persons skilled in the art know of many ways of storing photos and the kind of information that can be used for accessing the photos from a computer system. The "collection" as used here may be in reality two or more collections; for example, the information can specify Google+ albums, flickr albums, and one or more local drive directories. The system also obtains the images.

In step 210, the system receives or reads the attributes of the photos to be used for organizing. For example, the user of the system may define or select the attributes of interest, such as one or more human appearance characteristics (happiness, smile, expression of interest, poses, gender). The user may enter the attributes may be, for example, entered manually, or be predefined with default values. The user may also provide scaling factors defining the relative importance of each attribute. Again, the scaling factors may be, for example, entered manually, or be predefined with default values. Each attribute may have a continuous or a discrete range of values. For example, the "smile" attribute (or attribute of any other facial expression) may have any value (continuous) between 0 and 1 (or between any numbers), indicating the relative strength of the corresponding facial expression. The gender attribute may have only 0 and 1 values, corresponding to male/female, or vice versa. Certain facial expressions (or other characteristics), may have two or more attribute values.

In step 215, the system receives a definition of the topology to be populated with the organized photos. Examples of topologies include a line, circle (one dimensional organization); a grid or zoomable map, torus, surface of a sphere (two dimensional organization); or a volume of a cube (three dimensional organization). Other topologies may be used. The topology may be, for example, selected or otherwise defined manually, or be predefined as a default topology. The topology also may be chosen for an ability to represent the pairwise distances between attribute vectors using a minimum number of dimensions and/or using multidimensional scaling methods.

In step 220, the system receives the definition of "topology distance" in the space of the topology. Distance may be, for example, Euclidean, Mahalanobis, cosine, or so-called city block distance. Other types of "distance" may be used. Once again, the definition of the distance may be, for example, selected from choices provided to the user by the system, or be predefined as a default.

In step 225, the system receives the "maximum number" of picture clusters to populate the topology. The "maximum number" may be a hard limit, or a soft limit, as will be discussed below.

In step 230, the system computes a value for each of the specified attributes of each of the photos. Each photo thus has an attribute vector (in the attribute space) that includes the set of attributes of the photo in a predetermined order (which order may be the same for all the vectors). Each attribute value may be computed by a classifier of that attribute, any software for recognizing/evaluating facial expressions (or more generally, human appearance characteristics). The patent applications incorporated by reference above will help the interested reader to understand this better; another source of information J. Whitehill, M. Bartlett, G. Littlewort, I. Fasel, and J. R. Movellan, Towards Practical Smile Detection, Pattern Analysis and Machine Intelligence, (11):2106-2111 (2009), which is incorporated herein by reference for all purposes. In one example, pixels of a photo are processed to extract low level features (e.g., Gabor convolution), and the extracted low level features are evaluated (e.g., in a support vector machine) to estimated attribute values.

In some embodiments, the vector for each of the photos is supplemented with some measures of quality of the photo or a part of the photo. For example, quality may be the sharpness, lighting, or pixel resolution of the photo or of the face(s) in the photo. Other measures of quality may be used, and more than one measure may be combined to generate an overall measure of quality for an image.

In step 235, the photos are sorted topologically by attribute similarity; that is, the organizing principle is that neighbors must be similar. The similarity of two photos is measured by the distance between the locations of the photos in the attribute space (that is, between the end points of the vectors of the two photos in the attribute space). For example, the distance in the attribute space may be measured as a Euclidian distance; of course, the scaling factors for the attributes affect the Euclidian distance. Each photo can be thought of as a dimensionless point in the topology space. There may be many photos, more (great many more) than the maximum number specified in the step 225.

Note that some topologies wrap around, e.g., circle, sphere. For such topologies, the photos at the "end"—wherever that may be—are similar to the photos at the "beginning"—which is right next to the end.

In embodiments, the step 235 is performed so as to attempt to maximize or emphasize the attribute similarity of neighboring photos on the topology. A kernelized sorting may be used for this purpose (see Quadrianto, Song, & Smola (2009)). Kernel $K_{ij}=k(x_j, x_j)$ contains measures of image similarity (distances in the attribute space); kernel $L_{ij}=l(y_j, y_j)$ contains distances in the topology space. The may be allowed to sit on the same node in the topology, that is two or more images may be stacked on top of each other. Every photo is in a discrete place, no in-between photos. The nodes in the topology can be shuffled around to attempt to maximize or emphasize the match between K and L. Can permute images on the grid (topology). Note that there is a constraint on the number of nodes, which is the maximum number of clusters, see the description of step 225.

Permute nodes $y_j$ (i.e., move the clusters from node to node) to attempt to maximize or emphasize the match between K and L (plus a constraint on the number of visible photos or clusters, if the constraint is soft). The match may be measured by some cost function, which can be thought of as some loss function (or error, or analogous term function). For the purposes of this discussion, we assume that the cost function increases with increasing mismatching of the two kernels, and vice versa. For example, the Frobenius norm between K and L matrices plus a penalty constant times the number of images outside the maximum number of the step 225. (Thus, if the penalty constant goes to infinity, then you must have no more than the number of allowed images, and the maximum becomes essentially a hard constraint.)

For a good match, a search for the minimum of the cost function is performed. For example, many different of those permutations/placements may be tried to get an approximately good placement of nodes. Various search algorithms may also be used, and even a brute force approach trying all placements.

The problem is that the search is computationally costly once more than a few hundred images are involved. So, the search may be broken down into a series of substeps for a workable solution. Let us assume 100,000 photos as an example. Each of the photos may be treated as a dimensionless point (not as a photo with extent), and mapped onto the topology in some way. Off the shelf algorithms may be used for this, like multi-dimensional scaling, factor analysis, self-organizing maps, Laplacian eigenmaps, stochastic neighbor embedding, ISOMAP, local linear embedding, and others. For elements that are dimensionless points, the optimization problem becomes a continuous optimization problem, with known good solutions, and relatively easy. After mapping, nearby points (corresponding to the photos) are stacked (piled, clustered) to create the number of clusters according to the maximum number of the step 225 (let us refer to this number as $N_{max}$). K-means, EM on mixture of gaussians are clustering algorithms that can be used for this purpose.

Then, the kernel matching procedure may be applied to attempt to minimize the cost function. Because of the much smaller number of clusters than the number of photos, this step is much less computationally expensive. In embodiments, the difference between the number of photos in the collection and the number of clusters is at least one order of magnitude; in embodiments, the difference between the number of photos in the collection and the number of clusters is at least two orders of magnitude; in embodiments, the difference between the number of photos in the collection and the number of clusters is at least three orders of magnitude; in embodiments, the difference between the number of photos in the collection and the number of clusters is at least four orders of magnitude. For example with 100,000 images and $N_{max}$=100, optimizing 100 clusters/nodes is a tractable problem. Optimizing 100,000 clusters/nodes is much less so.

The step 235 may be repeated by varying the maximum number of clusters near $N_{max}$ (but not below the $N_{max}$ in some embodiments); this may uncover superior placements with a slightly increased number of clusters, despite the penalty to the cost function due to the number of additional clusters multiplied by the penalty constant. Alternative placements of the clusters on the topology may then be presented to the user and the user may be allowed to select the preferred placement.

In step 240, a representative photo is picked for each of the clusters from among the photos in the same cluster. The representative photo is then placed on top of its cluster. The representative photo may be selected randomly. Another way is to fit a probabilistic model to the photos in the particular cluster. Examples include but are not limited to Maximum Likelihood and Maximum Mutual Information. These approaches require the use of probabilistic models of the observed distribution of image features. Different approaches to choosing a representative photo also may be used.

Recall that the photos are described by their attributes. The model may be multi-dimensional (according to the number of attributes) Gaussian, describing the cluster with mean and standard deviation. Then, within the continuous topology (and still treating the photos as dimensionless points), pick the most popular image, that is, the image where most bunching of the images occurs in the cluster. In other words, pick the image nearest the peak of the multi-dimensional Gaussian distribution of the cluster.

In some aspects, clustering may be hierarchical. For example, at the first level 1,000 images may be represented by a single cluster. When clicking on the image representing that cluster, the cluster may break into 4 sub-clusters that each represent 250 images. When clicking on the image representing one of the 4 sub-clusters, the sub-cluster may break into 10 further sub-clusters that each represent 25 images. In these aspects, sub-clusters may represent equal (or approximately equal) numbers of images, or the sub-clusters may be organized on some other basis.

In step 245, the topology with the mapped clusters is displayed to the user; each cluster may appear as the selected photo. In embodiments the size of the displayed representative photo depends on the number of photos in the cluster of the representative photo, for example, the size of the representative photo may be proportional to the number of photos in the cluster. The user may be able to navigate through the topology, for example, pan, rotate the torus or spin the sphere (or another kind of topology), and/or otherwise view the organized photos. The topology with the mapped clusters represented by the representative photos may also be stored, transmitted over a networked connection, or used in any other way.

The user may be allowed to zoom recursively on a particular cluster or a number of clusters, to view parts of the collection, on different scales. The kernel and/or the cost functions may be adjusted or re-defined in each recursive zooming, to make sure the placement of the photos changes. The cost function may be adjusted by adding another penalty to the cost function for displaying photos that are far from the chosen location. The amount chosen to zoom in increases the penalty. The optimization process is applied to the new cost function. Examples of penalty terms include Euclidean distance from location, Gaussian distance from location, Uniform distance (either in or out).

The user may select the zooming region with a gesture or cursor, for example, by drawing a shape touching and/or encompassing the clusters to be zoomed on. The topology may then be reorganized with a new spatial constraint ($N_{max}$). This will allow for some piles to automatically break down into component images.

The process may then terminate in flow point 299.

The invention is in no way limited to the specifics of any particular embodiments and examples disclosed herein. For example, while various embodiments are disclosed with respect to facial expressions and human characteristics in images, some embodiments may be applied to images that do not include facial expressions or human characteristics. Details illustrated or disclosed with respect to any one embodiment may be used with other embodiments. Additional elements and/or steps may be added to various embodiments and/or some disclosed elements and/or steps may be subtracted from various embodiments without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope and spirit of the invention, and these variations would become clear to those skilled in the art after perusal of this application.

The invention claimed is:

1. A computer-implemented method of spatially organizing a collection of images, the method comprising steps of:
   obtaining a collection of images that include human faces;
   obtaining an attribute vector for each image of the collection of images, wherein each attribute vector includes attribute values for an associated image of the collection of images;
   obtaining an indication of one or more attributes of interest, wherein the one or more attributes of interest are associated with attribute values included in each attribute vector;
   obtaining scaling factors for each of the one or more attributes of interest;
   determining an organizational structure for mapping the collection of images;
   determining a maximum number of image clusters to be displayed in the organizational structure;
   sorting the collection of images based on the respective attribute values and the respective scaling factors for the attribute values;
   clustering the collection of images by similarity of the attribute values for each image of the collection of images, such that images in the collection of images are placed in the organizational structure based, at least in part, on the attribute values, thereby creating a plurality of image clusters, the plurality of image clusters including no more image clusters than the maximum number;
   picking a representative image for each image cluster; and
   displaying the representative images and, when a particular representative image is selected by a user, displaying the images in the image cluster represented by the particular representative image.

2. The computer-implemented method as in claim 1, wherein the attribute values of each image include one or more facial expression values, human appearance characteristic values, low level feature values, or some combination thereof.

3. The computer-implemented method as in claim 1, wherein the attribute vector for each image comprises the attribute values of each image in a predefined order and wherein clustering the collection of images further comprises clustering the collection of images based on the respective scaling factor for the attribute values.

4. The computer-implemented method as in claim 1, wherein obtaining the attribute vector for each image further comprises processing each image to obtain the attribute vector, the attribute vector for each image comprising the attribute values of each image in a predefined order.

5. The computer-implemented method as in claim 1, wherein the organizational structure for mapping the collection of images comprises one selected from a group consisting of a line, circle, grid, zoomable map, torus, surface of a sphere, and volume of a cube.

6. The computer-implemented method as in claim 1, wherein the organizational structure represents pairwise distances between attribute vectors using a minimum number of dimensions.

7. The computer-implemented method as in claim 1, wherein the organizational structure represents pairwise distances between attribute vectors using a multidimensional scaling method.

8. A computing device configured to spatially organize a collection of images, the computing device comprising:
   one or more processors; and
   a memory coupled to the one or more processors and comprising computer readable instructions that, when executed by the one or more processors, cause the computing device to:
   obtain a collection of images that include human faces;

obtain an attribute vector for each image of the collection of images, wherein each attribute vector includes attribute values for an associated image of the collection of images;

obtain an indication of one or more attributes of interest, wherein the one or more attributes of interest are associated with attribute values included in each attribute vector;

obtain scaling factors for each of the one or more attributes of interest;

determine an organizational structure for mapping the collection of images;

determine a maximum number of image clusters to be displayed in the organizational structure;

sort the collection of images based on the respective attribute values and the respective scaling factors for the attribute values;

cluster the collection of images by similarity of the attribute values for each image of the collection of images, such that images in the collection of images are placed in the organizational structure based, at least in part, on the attribute values, thereby creating a plurality of image clusters, the plurality of image clusters including no more image clusters than the maximum number;

pick a representative image for each image cluster; and output for display the representative images and, when a particular representative image is selected by a user, output for display the images in the image cluster represented by the particular representative image.

9. The computing device as in claim 8, wherein the attribute values of each image include one or more facial expression values, human appearance characteristic values, low level feature values, or some combination thereof.

10. The computing device as in claim 8, wherein the attribute vector for each image comprises the attribute values of each image in a predefined order, and wherein the instructions that cause the computing device to cluster the collection of images further comprise instructions that cause the computing device to cluster the collection of images based on the respective scaling factor for the attribute values.

11. The computing device as in claim 8, wherein the instructions that cause the computing device to obtain the attribute vector for each image further comprise instructions that cause the computing device to process each image to obtain the attribute vector, the attribute vector for each image comprising the attribute values of said each image in a predefined order.

12. The computing device as in claim 8, wherein the organizational structure for mapping the collection of images comprises one selected from a group consisting of a line, circle, grid, zoomable map, torus, surface of a sphere, and volume of a cube.

13. The computing device as in claim 8, wherein the organizational structure represents pairwise distances between attribute vectors using a minimum number of dimensions.

14. The computing device as in claim 8, wherein the organizational structure represents pairwise distances between attribute vectors using a multidimensional scaling method.

15. A non-transitory computer readable medium containing instructions that, when executed, cause one or more processors to:

obtain a collection of images that include human faces;

obtain an attribute vector for each image of the collection of images, wherein each attribute vector includes attribute values for an associated image of the collection of images;

obtain an indication of one or more attributes of interest, wherein the one or more attributes of interest are associated with attribute values included in each attribute vector;

obtain scaling factors for each of the one or more attributes of interest;

determine an organizational structure for mapping the collection of images;

determine a maximum number of image clusters to be displayed in the organizational structure;

sort the collection of images based on the respective attribute values and the scaling factors for the attribute values;

cluster the collection of images by similarity of the attribute values for each image of the collection of images, such that images in the collection of images are placed in the organizational structure based, at least in part, on the attribute values, thereby creating a plurality of image clusters, the plurality of image clusters including no more image clusters than the maximum number;

pick a representative image for each image cluster; and output for display the representative images and, when a particular representative image is selected by a user, output for display the images in the image cluster represented by the particular representative image.

16. The computer readable medium of claim 15, wherein the attribute values of each image include one or more facial expression values, human appearance characteristic values, or some combination thereof.

17. The computer readable medium of claim 15, wherein the attribute vector for each image comprises the attribute values of said image in a predefined order and wherein the instructions that cause the one or more processors to cluster the collection of images further comprise instructions that cause the one or more processors to cluster the collection of images based on the respective scaling factor for the attribute values.

18. The computer readable medium of claim 15, wherein the instructions that cause the one or more processors to obtain the attribute vector for each image further comprise instructions that cause the one or more processors to process each image to obtain the attribute vector, the attribute vector for each image comprising the attribute values of said each image in a predefined order.

19. The computer readable medium of claim 15, wherein the organizational structure for mapping the collection of images comprises a line, circle, grid, zoomable map, torus, surface of a sphere, or volume of a cube.

20. The computer readable medium of claim 15, wherein the organizational structure represents pairwise distances between attribute vectors using a minimum number of dimensions or a multidimensional scaling method.

* * * * *